United States Patent
Zlotnick

(10) Patent No.: US 6,694,059 B1
(45) Date of Patent: Feb. 17, 2004

(54) ROBUSTNESS ENHANCEMENT AND EVALUATION OF IMAGE INFORMATION EXTRACTION

(75) Inventor: Aviad Zlotnick, Mizpe Netofa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/575,013

(22) Filed: May 19, 2000

(51) Int. Cl.[7] .............................. G06K 9/74; G06K 9/46; G06K 9/36; G06K 9/38
(52) U.S. Cl. ...................... 382/228; 382/250; 382/253
(58) Field of Search ................... 382/250, 240, 382/253, 300, 298, 299, 205, 173, 190, 149, 228

(56) References Cited

U.S. PATENT DOCUMENTS

| | | | | |
|---|---|---|---|---|
| 4,809,344 A | * | 2/1989 | Peppers et al. | 382/173 |
| 5,335,295 A | * | 8/1994 | Ferracini et al. | 382/298 |
| 5,519,786 A | | 5/1996 | Courtney et al. | |
| 5,740,284 A | * | 4/1998 | Wober et al. | 382/250 |
| 5,754,678 A | * | 5/1998 | Hawthorne et al. | 382/149 |
| 5,787,194 A | | 7/1998 | Yair | |
| 5,787,196 A | | 7/1998 | Yair et al. | |
| 5,821,929 A | * | 10/1998 | Shimizu et al. | 382/190 |
| 5,912,986 A | | 6/1999 | Shustorovich | |
| 5,917,935 A | * | 6/1999 | Hawthorne et al. | 382/149 |
| 6,317,523 B1 | * | 11/2001 | Miura et al. | 382/298 |

FOREIGN PATENT DOCUMENTS

JP   404343572   *   5/1991   ............ H04N/1/40

OTHER PUBLICATIONS

"Edge Detector Resolution Improvement by Image Interpolation", IEEE Transactions on Pattern Analysis and Machine Intelligence (PAMI–9), vol. 3, pp, 446–451 (May, 1987) on order.

* cited by examiner

Primary Examiner—Samir Ahmed
Assistant Examiner—Brian Le
(74) Attorney, Agent, or Firm—Darby & Darby

(57) ABSTRACT

A method for recognition of features appearing in an input image includes upsampling the input image to generate an enlarged image including an increased number of pixels relative to the input image. The enlarged image is decimated to generate a plurality of intermediate images, each of the intermediate images including a different subset of the pixels in the enlarged image. An image recognition algorithm is applied to the intermediate images so as to generate respective recognition results, which are compared to generate an identification of the features appearing in the input image.

20 Claims, 2 Drawing Sheets

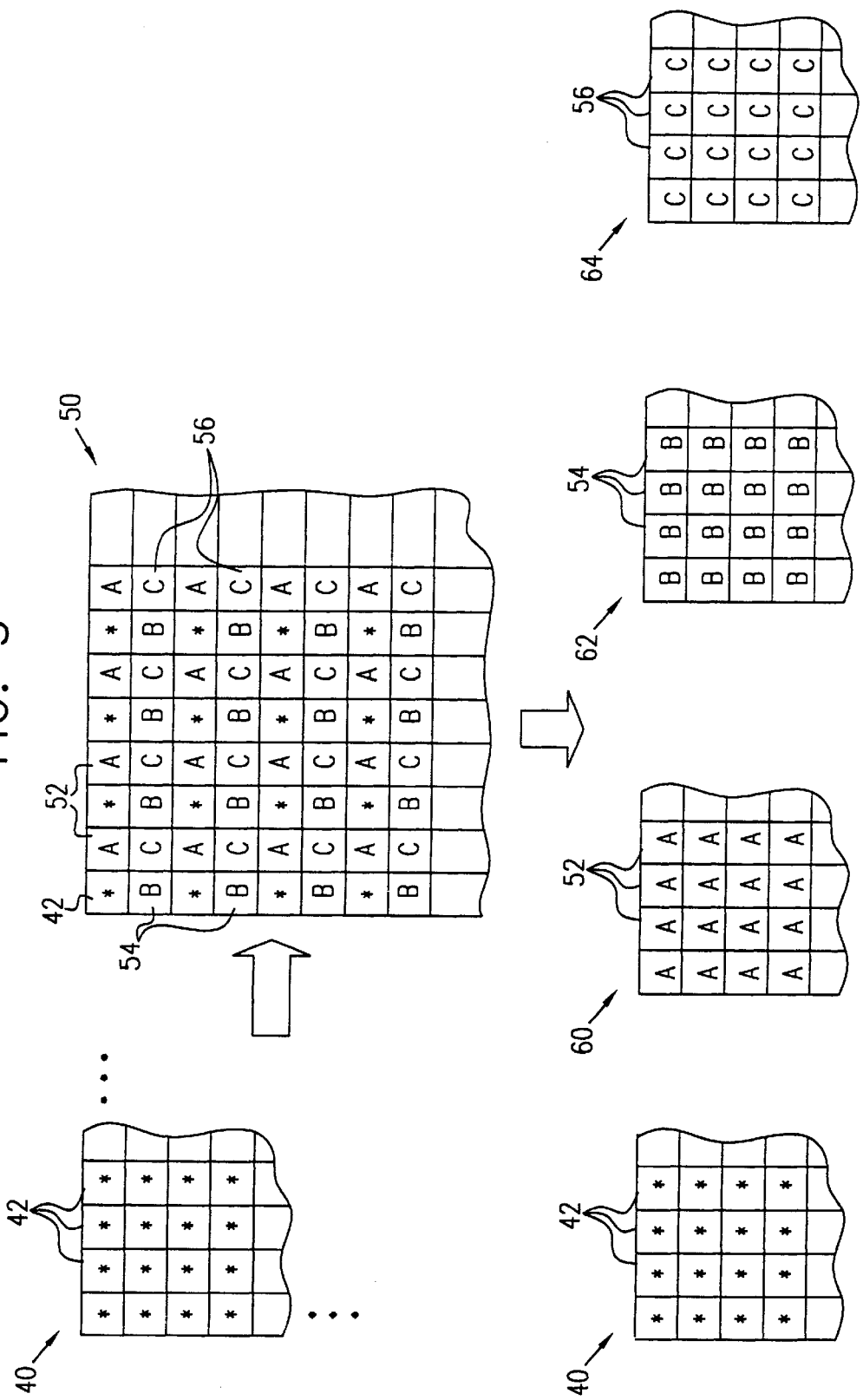

ROBUSTNESS ENHANCEMENT AND EVALUATION OF IMAGE INFORMATION EXTRACTION

FIELD OF THE INVENTION

The present invention relates generally to methods and systems for image analysis, and specifically to methods for optical character recognition.

BACKGROUND OF THE INVENTION

Algorithms for recognition of image features, such as optical character recognition (OCR) algorithms, are often sensitive to minor variations in the input image. One method for overcoming this sensitivity, and thus increasing the robustness of image recognition, is to apply a number of different algorithms to the same image. A "voting" procedure is then applied to select a recognition result, such as the correct reading of a string of characters, from among the group of results returned by the different algorithms.

For example, U.S. Pat. No. 5,519,786, whose disclosure is incorporated herein by reference, describes a method and apparatus for implementing a weighted voting scheme for reading and accurately recognizing characters in a scanned image. A plurality of OCR processors scan the image and read the same image characters. Each OCR processor outputs a reported character corresponding to each character read. For a particular character read, the characters reported by each OCR processor are grouped into a set of character candidates. For each character candidate, a weight is generated in accordance with a confusion matrix. The weights are then compared to determine which character candidate to output.

As another example, U.S. Pat. No. 5,912,986, whose disclosure is incorporated herein by reference, describes an evidential confidence measure and rejection technique for use in a neural network-based OCR system. The technique is used to generate a confidence measure for use in deciding whether to accept or reject each classified character.

SUMMARY OF THE INVENTION

It is an object of the present invention to provide an improved technique for image recognition, and particularly for OCR.

It is a further object of some aspects of the present invention to provide methods and apparatus for image recognition with enhanced robustness.

It is yet a further object of some aspects of the present invention to provide methods for evaluating the robustness of image recognition techniques.

In preferred embodiments of the present invention, an input image containing a string of one or more characters is upsampled to generate an enlarged image. The upsampling is preferably accomplished by adding pixels between the existing pixels of the input image and then setting the values of the added pixels using appropriate operations, as are known in the art. Preferably, the operations applied to the image include neighborhood operations, such as interpolation and edge enhancement, whereby the value of each added pixel is determined as a function of the values of the existing pixels in its neighborhood.

The enlarged image is then downsampled, or decimated, to generate a plurality of intermediate images. Preferably, the enlarged image is divided into blocks, and one pixel in each block is sent to each of the intermediate images, so that each of the intermediate images comprises a different subset of the pixels of the enlarged image. Most preferably, the downsampling and upsampling rates are selected so that the intermediate images are all equal in size to the input image. (Typically, one of the intermediate images is the input image itself.) An image recognition algorithm, such as an OCR algorithm, is applied to all of the intermediate images, so as to generate an intermediate recognition result, such as a character string, for each of the intermediate images.

The different intermediate results are compared in order to find a final recognition result. Preferably, a voting procedure is used to select as the final result the most commonly-occurring intermediate result, or an intermediate result with a high cumulative confidence score. When two or more of the intermediate results are in agreement, the final result can be selected with high confidence, even if the recognition algorithm did not indicate high confidence in the intermediate result of any individual intermediate image (and even when one or more of the intermediate images may have returned no result at all). Alternatively or additionally, the range of results and their scores are used to derive a measure of the robustness of the final result. The present invention is advantageous by comparison with voting-based methods of image recognition known in the art in that it overcomes small image artifacts that interfere with recognition without the heavy demand on computing resources required in order to apply several different algorithms to the same image.

There is therefore provided, in accordance with a preferred embodiment of the present invention, a method for recognition of features appearing in an input image, including:

upsampling the input image to generate an enlarged image including an increased number of pixels relative to the input image;

decimating the enlarged image to generate a plurality of intermediate images, each of the intermediate images including a different subset of the pixels in the enlarged image;

applying an image recognition algorithm to the intermediate images so as to generate respective recognition results; and comparing the recognition results to generate an identification of the features appearing in the input image.

Preferably, upsampling the input image includes applying a neighborhood operation to assign values to the pixels in the enlarged image. Further preferably, decimating the enlarged image includes dividing the enlarged image into an array of blocks, each block containing a predetermined number of pixels, and assigning each of the pixels in each of the blocks to a different one of the intermediate images. Most preferably, the number of blocks in the array is substantially equal to the number of pixels in the input image, whereby the intermediate images are substantially equal in size to the input image.

In a preferred embodiment, the features includes characters, and wherein applying the image recognition algorithm includes applying optical character recognition to identify the characters.

Preferably, comparing the recognition results includes applying a voting procedure to select the identification that is supported by the recognition results of two or more of the intermediate images. Alternatively or additionally, comparing the recognition results includes assessing a level of robustness of the identification responsive to variations among the recognition results.

There is also provided, in accordance with a preferred embodiment of the present invention, a method for recognition of features appearing in an input image made up of a matrix of pixels having pixel values, the method including:

defining a family of neighborhood operations;

applying the operations in the family to the input image so as to generate respective intermediate images;

applying an image recognition algorithm to the intermediate images so as to generate respective recognition results; and comparing the recognition results to generate an identification of the features appearing in the input image.

Preferably, defining the family of neighborhood operations includes defining one or more convolution kernels, and wherein applying the operations includes convolving the pixels of the input image with the one or more kernels.

There is additionally provided, in accordance with a preferred embodiment of the present invention, apparatus for recognition of features appearing in an input image, including an image processor, which is adapted to upsample the input image so as to generate an enlarged image including an increased number of pixels relative to the input image, to decimate the enlarged image so as to generate a plurality of intermediate images, each of the intermediate images including a different subset of the pixels in the enlarged image, to apply an image recognition algorithm to the intermediate images so as to generate respective recognition results, and to compare the recognition results so as to generate an identification of the features appearing in the input image.

There is further provided, in accordance with a preferred embodiment of the present invention, apparatus for recognition of features appearing in an input image made up of a matrix of pixels having pixel values, the apparatus including an image processor, which is adapted to apply a predefined family of neighborhood operations to the input image so as to generate respective intermediate images, to apply an image recognition algorithm to the intermediate images so as to generate respective recognition results, and to compare the recognition results so as to generate an identification of the features appearing in the input image.

There is moreover provided, in accordance with a preferred embodiment of the present invention, a computer software product for recognition of features appearing in an input image, the product including a computer-readable medium in which program instructions are stored, which instructions, when read by a computer, cause the computer to upsample the input image so as to generate an enlarged image including an increased number of pixels relative to the input image, to decimate the enlarged image so as to generate a plurality of intermediate images, each of the intermediate images including a different subset of the pixels in the enlarged image, to apply an image recognition algorithm to the intermediate images so as to generate respective recognition results, and to compare the recognition results so as to generate an identification of the features appearing in the input image.

There is furthermore provided, in accordance with a preferred embodiment of the present invention, a computer software product for recognition of features appearing in an input image, the product including a computer-readable medium in which program instructions are stored, which instructions, when read by a computer, cause the computer to apply a predefined family of neighborhood operations to the input image so as to generate respective intermediate images, to apply an image recognition algorithm to the intermediate images so as to generate respective recognition results, and to compare the recognition results so as to generate an identification of the features appearing in the input image.

The present invention will be more fully understood from the following detailed description of the preferred embodiments thereof, taken together with the drawings in which:

BRIEF DESCRIPTION OF THE DRAWINGS

FIG. 3 is a schematic illustration of pixels in a sequence of images generated using the method of FIG. 2, in accordance with a preferred embodiment of the present invention.

DETAILED DESCRIPTION OF PREFERRED EMBODIMENTS

Figure 1:
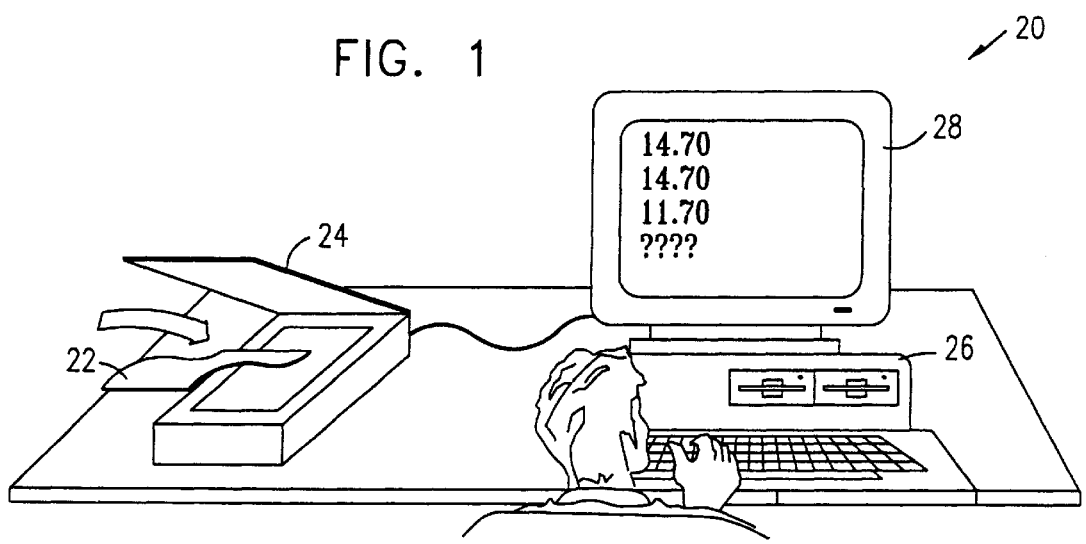
FIG. 1 is a schematic, pictorial illustration of an image recognition system, in accordance with a preferred embodiment of the present invention.

FIG. 1 is a schematic, pictorial illustration of a system 20 for recognition of image features, in accordance with a preferred embodiment of the present invention. System 20 typically comprises an input device 24, such as a scanner, which forms an electronic image of a document 22. Alternatively, the input device may comprise a video or digital still camera, or substantially any other type of electronic imaging device known in the art, which is used to form an image of substantially any sort of two- or three-dimensional object. Further alternatively, the image may be input to system 20 from a disk or other storage medium or via a communication link. Preferably, the image comprises a gray-scale image, although the methods described hereinbelow are also applicable, mutatis mutandis, to binary images and to color images.

The image of document 22 is input to an image processor 26, which typically comprises a general-purpose computer with suitable software. The software may be downloaded to the computer in electronic form, via a network or other communication link, or it may alternatively be supplied on tangible media, such as CD-ROM or nonvolatile memory, for installation in the computer. Further alternatively, processor 26 may comprise dedicated image-processing hardware or a programmable digital signal processor (DSP), or a combination of dedicated and general-purpose elements. Image processor 26 processes the image of document 22 to extract information therefrom, as described hereinbelow. Typically, the document includes handwritten or printed characters, and the information extracted from the document comprises an alphanumeric string determined by means of OCR. The processor preferably conveys the extracted information to an output device, such as a monitor 28, and/or transmits the information over a network or stores it to disk.

Figure 2:
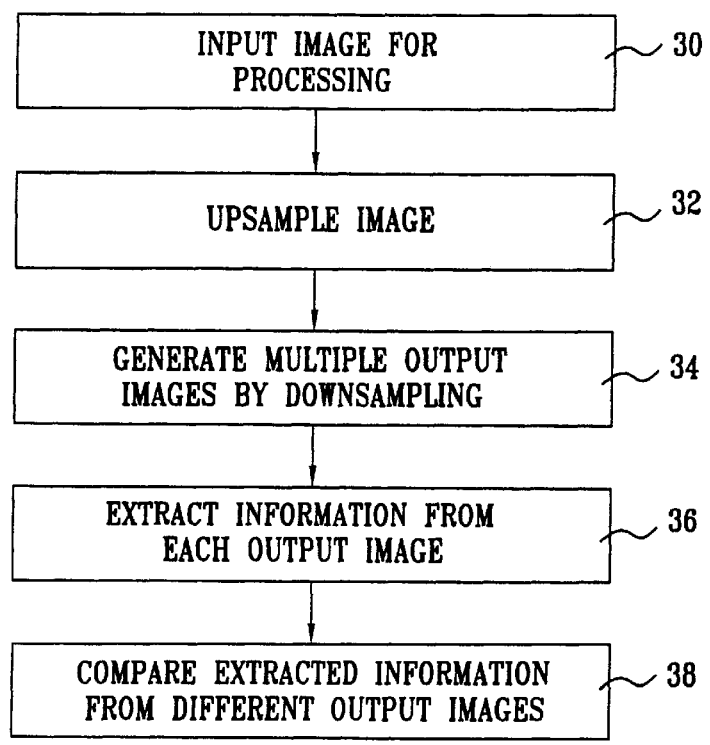
FIG. 2 is a flow chart that schematically illustrates a method for recognition of image features, in accordance with a preferred embodiment of the present invention.

FIG. 2 is a flow chart that schematically illustrates a method for extraction of the information from document 22 by processor 26, in accordance with a preferred embodiment of the present invention. At an input step 30, the image of the document is input from input device 24 to processor 26 for extraction of the information therefrom. At an upsampling step 32, the input image is upsampled to increase its size, by adding pixels between the existing pixels of the input image and then setting the values of the added pixels using appropriate operations. A wide range of different operations have been developed for this purpose, such as interpolation and edge enhancement. These operations are typically based on neighborhood operations on the pixels of the image, i.e., operations that determine the value of a pixel in the enlarged image based on the values of the pixels in its vicinity in the input image.

A preferred method for upsampling of this sort is described by Nalwa in an article entitled "Edge Detector Resolution Improvement by Image Interpolation," in *IEEE Transactions on Pattern Analysis and Machine Intelligence* PAMI-9(3), pages 446–451 (May, 1987), which is incorporated herein by reference. The method doubles the dimensions of the input image by convolving the image with a kernel given by (with normalization as required):

$$\begin{pmatrix} 1 & 0 & -9 & -16 & -9 & 0 & 1 \\ 0 & 0 & 0 & 0 & 0 & 0 & 0 \\ -9 & 0 & 81 & 144 & 81 & 0 & -9 \\ -16 & 0 & 144 & 256 & 144 & 0 & -16 \\ -9 & 0 & 81 & 144 & 81 & 0 & -9 \\ 0 & 0 & 0 & 0 & 0 & 0 & 0 \\ 1 & 0 & -9 & -16 & -9 & 0 & 1 \end{pmatrix} \quad (1)$$

As a result, an input image of 1000×1000 pixels, for example, is expanded into an enlarged image of 2000×2000 pixels, while edges in the enlarged image are enhanced. It will be understood, however, that Nalwa's method is cited here by way of example, and other methods of upsampling, including both linear and nonlinear operations, may also be used. Similarly, although the present embodiment is based on doubling of the image dimensions, other image sizes and enlargement ratios may be used, as well.

FIG. 3 is a schematic illustration of pixels in a sequence of images generated in the course of carrying out the method of FIG. 2, in accordance with a preferred embodiment of the present invention. An input image 40 comprises a matrix of pixels 42. For simplicity of illustration, only one corner of the image is shown. Upsampling step 32 yields an enlarged image 50, which preferably comprises pixels 42, which maintain their original values from image 40, together with new pixels 52, 54 and 56. Alternatively, the upsampling operation may be such that none of the pixels in image 50 preserve identically the values of the pixels in input image 40.

Enlarged image 50 is downsampled, at a downsampling step 34, to generate multiple intermediate images 40, 60, 62 and 64. From each 2×2 block of pixels in image 50, pixel 42 is sent to image 40 (reproducing in this case the original input image), pixel 52 is sent to image 60, pixel 54 and to image 62, and pixel 56 to image 64. Effectively, the combination of steps 32 and 34 is equivalent to defining a family of four neighborhood operations, based on the kernel given above in expression (1), for example. Each neighborhood operation determines the values of the pixels in a corresponding one of intermediate images 40, 60, 62 and 64, based on the values of pixels 42 in input image 40. (For intermediate image 40, the corresponding operation is simply the identity operation.) Images 60, 62 and 64 closely resemble image 40, but they are different in minor details to which recognition algorithms are sensitive.

Alternatively, the pixel assigned to each of the intermediate images need not be the same in each of the 2×2 blocks in enlarged image 50. In one preferred embodiment, the pixel to be assigned to each of the intermediate images is chosen in each block at random. In this manner, many different intermediate images may be constructed, for use in the subsequent steps of the method of FIG. 3. Further alternatively or additionally, the intermediate images need not be identical to input image 40 in their dimensions, and may instead be either larger or smaller than the input image.

At an information extraction step 36, each of the intermediate images is processed to extract the desired information therefrom. For OCR applications, substantially any algorithm known in the art may be used at this step to identify the characters in the intermediate images. For example, character segmentation algorithms, as described in U.S. Pat. Nos. 5,787,194 and 5,787,196, can be used in this context.

At an information comparison step 38, the recognition results obtained from the different intermediate images are compared. Preferably, a voting procedure is used at this stage, as is known in the art. Typically, the OCR algorithm outputs a string of alphanumeric characters, representing its "best guess" at the meaning of the characters in the image. The algorithm also generates a score indicating a level of confidence that the output string is correct. When two or more of the intermediate images give the same output string, even with relatively low confidence scores, the string can be awarded a cumulative confidence score that is substantially higher. In consequence, processor 26 is able to select the appropriate output string with an adequate level of confidence in some cases in which the OCR algorithm operating on the input image alone gives a level of confidence too low to rely on, or even returns no result at all. In experiments carried out by the inventor on 207 handwritten strings of numbers, an increase of about 20% was noted in the number of images that were classified correctly with high confidence using the method of the present invention (114 images), as compared with the number of high-confidence classifications made with OCR on the input image alone (94 images).

Alternatively or additionally, the voting procedure at step 38 may be used to reject even a high-confidence recognition result if it was obtained, for example, from only one of the intermediate images and not the others. This procedure can be useful in preventing incorrect readings (substitutions).

Further alternatively or additionally, the comparison of the results at step 38 may be used to evaluate the robustness of system 20 in recognizing the characters or other features on document 22. In this case, the system (or specifically, an algorithm running on processor 26) is considered to be robust if all of the intermediate images derived from a given input image yield the same output result. The intentionally-imposed variations among the intermediate images are representative of actual variations that occur in operation of the system. If the intermediate images give different output results for a large fraction of the input images, then the robustness of the system is suspect.

While preferred embodiments are described herein mainly with reference to OCR, the principles of the present invention are similarly applicable in other areas of image feature extraction and recognition. It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for recognition of features appearing in an input image, comprising:

upsampling the input image to generate an enlarged image comprising an increased number of pixels relative to the input image;

decimating the enlarged image to generate a plurality of intermediate images, each of the intermediate images comprising a different subset of the pixels in the enlarged image;

applying an image recognition algorithm to the intermediate images so as to generate respective recognition results; and comparing the recognition results to generate an identification of the features appearing in the input image, wherein decimating the enlarged image comprises dividing the enlarged image into an array of blocks, each block containing a predetermined number of pixels, and assigning each of the pixels in each of the blocks to a different one of the intermediate images.

2. A method according to claim 1, wherein the number of blocks in the array is equal to the number of pixels in the input image, whereby the intermediate images are equal in size to the input image.

3. A method for recognition of features appearing in an input image, comprising:

upsampling the input image to generate an enlarged image comprising an increased number of pixels relative to the input image;

decimating the enlarged image to generate a plurality of intermediate images, each of the intermediate images comprising a different subset of the pixels in the enlarged image;

applying an image recognition algorithm to the intermediate images so as to generate respective recognition results; and comparing the recognition results to generate an identification of the features appearing in the input image, wherein the features comprises characters, and wherein applying the image recognition algorithm comprises applying optical character recognition to identify the characters.

4. A method for recognition of features appearing in an input image, comprising:

upsampling the input image to generate an enlarged image comprising an increased number of pixels relative to the input image;

decimating the enlarged image to generate a plurality of intermediate images, each of the intermediate images comprising a different subset of the pixels in the enlarged image;

applying an image recognition algorithm to the intermediate images so as to generate respective recognition results; and comparing the recognition results to generate an identification of the features appearing in the input image, wherein comparing the recognition results comprises applying a voting procedure to select the identification that is supported by the recognition results of two or more of the intermediate images.

5. A method for recognition of features appearing in an input image, comprising:

upsampling the input image to generate an enlarged image comprising an increased number of pixels relative to the input image;

decimating the enlarged image to generate a plurality of intermediate images, each of the intermediate images comprising a different subset of the pixels in the enlarged image;

applying an image recognition algorithm to the intermediate images so as to generate respective recognition results; and comparing the recognition results to generate an identification of the features appearing in the input image, wherein comparing the recognition results comprises assessing a level of robustness of the identification responsive to variations among the recognition results.

6. A method for recognition of features appearing in an input image made up of a matrix of pixels having pixel values, the method comprising:

defining a family of neighborhood operations;

applying the operations in the family to the input image so as to generate respective intermediate images;

applying an image recognition algorithm to the intermediate images so as to generate respective recognition results; and comparing the recognition results to generate an identification of the features appearing in the input image, wherein the features comprises characters, and wherein applying the image recognition algorithm comprises applying optical character recognition to identify the characters.

7. A method for recognition of features appearing in an input image made up of a matrix of pixels having pixel values, the method comprising:

defining a family of neighborhood operations;

applying the operations in the family to the input image so as to generate respective intermediate images;

applying an image recognition algorithm to the intermediate images so as to generate respective recognition results; and comparing the recognition results to generate an identification of the features appearing in the input image, wherein comparing the recognition results comprises applying a voting procedure to select the identification that is supported by the recognition results of two or more of the intermediate images.

8. A method for recognition of features appearing in an input image made up of a matrix of pixels having pixel values, the method comprising:

defining a family of neighborhood operations;

applying the operations in the family to the input image so as to generate respective intermediate images;

applying an image recognition algorithm to the intermediate images so as to generate respective recognition results; and comparing the recognition results to generate an identification of the features appearing in the input image, wherein comparing the recognition results comprises assessing a level of robustness of the identification responsive to variations among the recognition results.

9. Apparatus for recognition of features appearing in an input image, comprising an image processor, which is adapted to upsample the input image so as to generate an enlarged image comprising an increased number of pixels relative to the input image, to decimate the enlarged image so as to generate a plurality of intermediate images, each of the intermediate images comprising a different subset of the pixels in the enlarged image, to apply an image recognition algorithm to the intermediate images so as to generate respective recognition results, and to compare the recognition results so as to generate an identification of the features appearing in the input image, wherein the features comprises characters, and wherein the image recognition algorithm comprises an optical character recognition algorithm, used by the processor to identify the characters.

10. Apparatus for recognition of features appearing in an input image, comprising an image processor, which is adapted to upsample the input image so as to generate an enlarged image comprising an increased number of pixels relative to the input image, to decimate the enlarged image so as to generate a plurality of intermediate images, each of the intermediate images comprising a different subset of the pixels in the enlarged image, to apply an image recognition algorithm to the intermediate images so as to generate respective recognition results, and to compare the recognition results so as to generate an identification of the features appearing in the input image, wherein the processor is adapted to apply a voting procedure to select the identification that is supported by the recognition results of two or more of the intermediate images.

11. Apparatus for recognition of features appearing in an input image, comprising an image processor, which is adapted to upsample the input image so as to generate an enlarged image comprising an increased number of pixels relative to the input image, to decimate the enlarged image so as to generate a plurality of intermediate images, each of the intermediate images comprising a different subset of the pixels in the enlarged image, to apply an image recognition algorithm to the intermediate images so as to generate respective recognition results, and to compare the recognition results so as to generate an identification of the features appearing in the input image, wherein the processor is adapted to assess a level of robustness of the identification responsive to variations among the recognition results.

12. Apparatus for recognition of features appearing in an input image made up of a matrix of pixels having pixel values, the apparatus comprising an image processor, which is adapted to apply a predefined family of neighborhood operations to the input image so as to generate respective intermediate images, to apply an image recognition algorithm to the intermediate images so as to generate respective recognition results, and to compare the recognition results so as to generate an identification of the features appearing in the input image, wherein the features comprises characters, and wherein the image recognition algorithm comprises an optical character recognition algorithm, used by the processor to identify the characters.

13. Apparatus for recognition of features appearing in an input image made up of a matrix of pixels having pixel values, the apparatus comprising an image processor, which is adapted to apply a predefined family of neighborhood operations to the input image so as to generate respective intermediate images, to apply an image recognition algorithm to the intermediate images so as to generate respective recognition results, and to compare the recognition results so as to generate an identification of the features appearing in the input image, wherein the processor is adapted to apply a voting procedure to select the identification that is supported by the recognition results of two or more of the intermediate images.

14. Apparatus for recognition of features appearing in an input image made up of a matrix of pixels having pixel values, the apparatus comprising an image processor, which is adapted to apply a predefined family of neighborhood operations to the input image so as to generate respective intermediate images, to apply an image recognition algorithm to the intermediate images so as to generate respective recognition results, and to compare the recognition results so as to generate an identification of the features appearing in the input image, wherein the processor is adapted to assess a level of robustness of the identification responsive to variations among the recognition results.

15. A computer software product for recognition of features appearing in an input image, the product comprising a computer-readable medium in which program instructions are stored, which instructions, when read by a computer, cause the computer to upsample the input image so as to generate an enlarged image comprising an increased number of pixels relative to the input image, to decimate the enlarged image so as to generate a plurality of intermediate images, each of the intermediate images comprising a different subset of the pixels in the enlarged image, to apply an image recognition algorithm to the intermediate images so as to generate respective recognition results, and to compare the recognition results so as to generate an identification of the features appearing in the input image, wherein the features comprises characters, and wherein the instructions cause the computer to apply an optical character recognition algorithm so as to identify the characters.

16. A computer software product for recognition of features appearing in an input image, the product comprising a computer-readable medium in which program instructions are stored, which instructions, when read by a computer, cause the computer to upsample the input image so as to generate an enlarged image comprising an increased number of pixels relative to the input image, to decimate the enlarged image so as to generate a plurality of intermediate images, each of the intermediate images comprising a different subset of the pixels in the enlarged image, to apply an image recognition algorithm to the intermediate images so as to generate respective recognition results, and to compare the recognition results so as to generate an identification of the features appearing in the input image, wherein the instructions cause the computer to apply a voting procedure to select the identification that is supported by the recognition results of two or more of the intermediate images.

17. A computer software product for recognition of features appearing in an input image, the product comprising a computer-readable medium in which program instructions are stored, which instructions, when read by a computer, cause the computer to upsample the input image so as to generate an enlarged image comprising an increased number of pixels relative to the input image, to decimate the enlarged image so as to generate a plurality of intermediate images, each of the intermediate images comprising a different subset of the pixels in the enlarged image, to apply an image recognition algorithm to the intermediate images so as to generate respective recognition results, and to compare the recognition results so as to generate an identification of the features appearing in the input image, wherein the instructions cause the computer to assess a level of robustness of the identification responsive to variations among the recognition results.

18. A computer software product for recognition of features appearing in an input image, the product comprising a computer-readable medium in which program instructions are stored, which instructions, when read by a computer, cause the computer to apply a predefined family of neighborhood operations to the input image so as to generate respective intermediate images, to apply an image recognition algorithm to the intermediate images so as to generate respective recognition results, and to compare the recognition results so as to generate an identification of the features appearing in the input image, wherein the features comprises characters, and wherein the instructions cause the computer to apply an optical character recognition algorithm so as to identify the characters.

19. A computer software product for recognition of features appearing in an input image, the product comprising a computer-readable medium in which program instructions are stored, which instructions, when read by a computer, cause the computer to apply a predefined family of neighborhood operations to the input image so as to generate respective intermediate images, to apply an image recognition algorithm to the intermediate images so as to generate respective recognition results, and to compare the recognition results so as to generate an identification of the features appearing in the input image, wherein the instructions cause the computer to apply a voting procedure to select the identification that is supported by the recognition results of two or more of the intermediate images.

20. A computer software product for recognition of features appearing in an input image, the product comprising a computer-readable medium in which program instructions are stored, which instructions, when read by a computer, cause the computer to apply a predefined family of neighborhood operations to the input image so as to generate respective intermediate images, to apply an image recognition algorithm to the intermediate images so as to generate respective recognition results, and to compare the recognition results so as to generate an identification of the features appearing in the input image, wherein the instructions cause the computer to assess a level of robustness of the identification responsive to variations among the recognition results.

* * * * *